Figure 1:
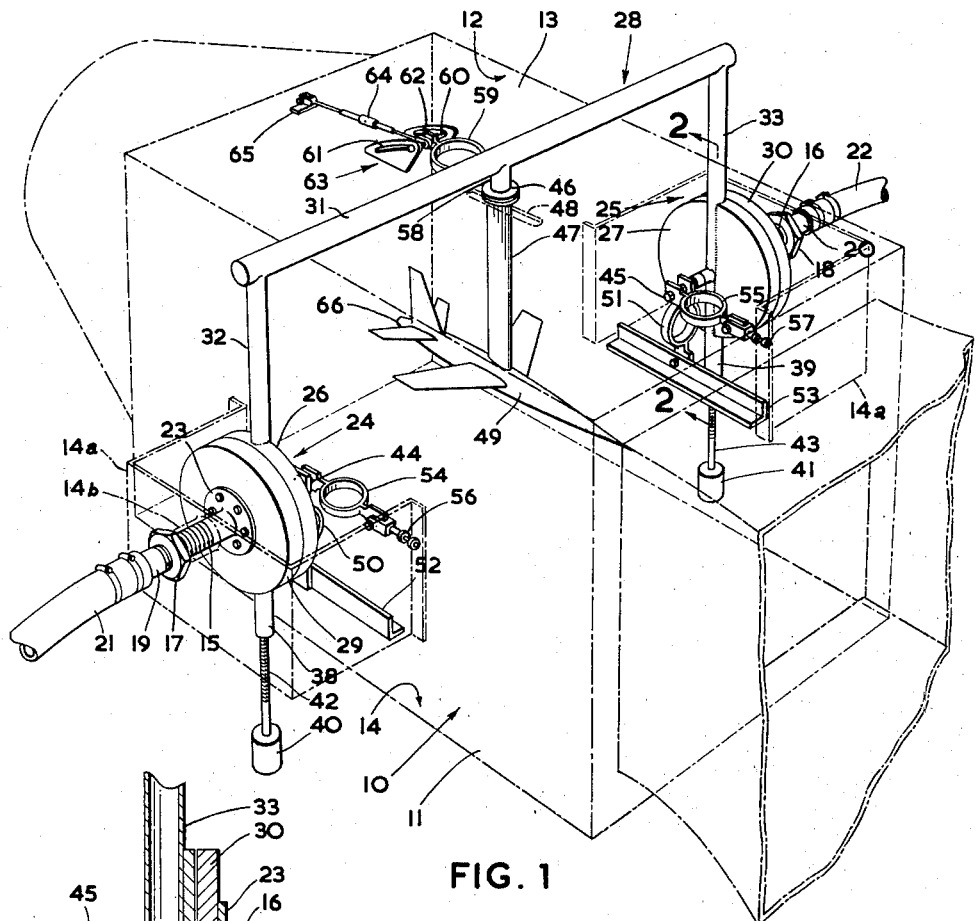

Nov. 3, 1959     W. CZERWINSKI     2,910,866
STRUCTURE FOR SUPPORTING A MODEL IN A WIND TUNNEL
AND SUPPLYING COMPRESSED FLUID TO THE MODEL
Filed Aug. 15, 1957

*INVENTOR*
W. CZERWINSKI

BY: Maybee Legris
*ATTORNEYS*

United States Patent Office

2,910,866
Patented Nov. 3, 1959

2,910,866

STRUCTURE FOR SUPPORTING A MODEL IN A WIND TUNNEL AND SUPPLYING COMPRESSED FLUID TO THE MODEL

Waclaw Czerwinski, Toronto, Ontario, Canada, assignor to Avro Aircraft Limited, Malton, Ontario, Canada, a corporation Application August 15, 1957, Serial No. 678,350

5 Claims. (Cl. 73—147)

This invention relates to a structure for supporting a model in a wind tunnel and supplying compressed fluid to the model. The structure has particular application to supplying air to an aircraft model and to supporting the model in a wind tunnel.

With the advent of modern jet aircraft employing engines having a very high thrust and mass flow, it is becoming increasingly necessary to simulate the jet efflux in a wind tunnel test model. Furthermore, with increased activity in the study of boundary layer control, improved means are also required for supplying air to a model under study in such a manner that the stiffness of the supply duct does not influence the assimilation of the aerodynamic loads applied to the model.

It has been the practice to supply compressed air to a test model, mounted on a wind tunnel balance, by means of ducts with couplings employing labyrinth seals and the like. Such couplings are generally unsatisfactory because of their complication and cost, and more particularly, because of the attendant high pressure drop across the coupling—which is difficult to determine accurately because it is not constant—and because of the large loss in mass flow under high pressure conditions.

An object of the invention is to provide a structure which will support a model in a wind tunnel and will supply a large mass flow of fluid under pressure to the model while reducing to a minimum the friction between the elements of a fluid transfer coupling interposed between a support for the model and a mount for the support.

According to the invention, a structure for supporting a model in a wind tunnel and supplying compressed fluid to the model includes a yoke member, an arm having one end fast to the yoke member and the other end arranged for the attachment of a model, a mount for the yoke member permitting freedom of movement thereof relative to the wind tunnel, support means stationary relatively to the wind tunnel, a fluid transfer coupling interposed between the yoke member and the support means, the coupling comprising a pair of co-operating elements, the first element of the pair being secured to the yoke member and the second element of the pair being secured to the support means, mutually registering ports in both elements of the coupling, an inlet in the second element for the supply of compressed fluid to the port in the element, and duct means leading to the model from the port in the first element, a clearance being provided between the elements of the coupling permitting some of the fluid supplied to the coupling to pass between its elements to form a lubricating film.

Figure 2:
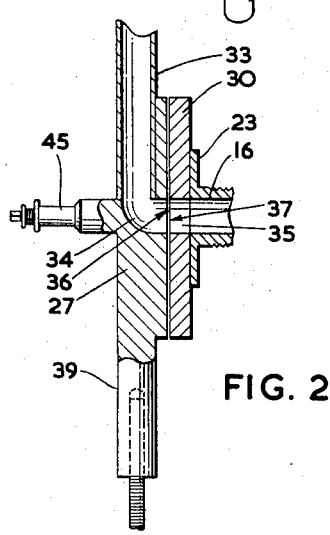

Other objects and advantages of the invention will become apparent to those skilled in the art from the following description read in conjunction with the accompanying drawings, in which like reference characters refer to like parts throughout and in which:

Figure 1 is a perspective view of a wind tunnel working section showing a structure according to the invention; and Figure 2 is a sectional view, on a larger scale, of a fluid transfer coupling taken along the line 2—2 in Figure 1.

Referring now to the drawings, the rectangular working section of a wind tunnel generally indicated at 10 comprises walls 11 and 12 of transparent plastic material, a roof 13 and a floor 14, both of sheet metal, supported on a rigid girder framework (not shown). Secured to each side of the wind tunnel are support means 14a which are U-shaped in plan and open at the top and bottom.

In threaded engagement with internally threaded sleeves 14b on the support means 14a are externally screw threaded ducts 15 and 16 which are normal to the longitudinal axis of the tunnel 10. The ducts carry lock-nuts 17 and 18 and terminate outwardly in adaptor ends 19 and 20, for connection to an air supply through flexible hoses 21 and 22; and terminate inwardly in flange fittings 23.

Fluid transfer couplings, generally indicated at 24 and 25, each comprise a pair of co-operating elements in the form of plates. The first plates of each pair, indicated at 26 and 27, are secured to the free ends of a yoke member generally indicated at 28. The second plates of each pair, indicated at 29 and 30, are bolted to the flange fittings 23 and have inlets in continuation of ducts 15 and 16.

The yoke member 28 consists of a transverse hollow member 31 and two hollow members 32 and 33 dependent from the ends thereof and terminating in the first plates 26 and 27. Referring now to Figure 2, it will be seen that the hollow member 33 is received in a channel milled in one face of the plate 27 and that a right-angled duct 34 leads from the bore of the member 33 to the face of the plate 27 which is adjacent to the plate 30. The inlet in the plate 30 is indicated at 35 and is a continuation of the duct 16. The duct 34 and the inlet 35 terminate in mutually registering ports indicated at 36 and 37. The arrangement of the fluid transfer coupling 24 is similar to that of the coupling 25.

Diametrically opposite to the hollow members 32 and 33, the first plates 26, 27 carry arms 38 and 39 which support balance weights 40, 41 on adjustable screwed rods 42, 43. Trunnions 44, 45 project inwardly from the first plates 26 and 27 at their centres of rotation and form the fulcrum points of the yoke member 28. Depending from the cross member 31 is an adaptor 46 to which is attached a hollow model-mounting arm 47 extending through a slot 48 in the tunnel roof 13. The arm 47 carries a model 49 for test in a position such that the resolving centre of the model i.e. the point about which it is desired to resolve the aerodynamic forces, lies on the axis of rotation of the yoke member 28, i.e. in line with the trunnions 44, 45.

Flexure ring links 50 and 51 support the yoke member 28, being rotatably connected by their lugs through self aligning anti-friction bearings to the trunnions 44, 45 and to structural members 52, 53 respectively, the latter being rigidly attached to the support means 14a. These links 50, 51 allow limited rotation of the yoke member 28 on its trunnions 44 and 45 and also limited linear vertical movement of the yoke member. Flexure ring links 54, 55 are also rotatably attached by their lugs to trunnions 44, 45 and to clevis fittings 56, 57 which are rigidly attached to the support means 14a. The links 54, 55 stabilize the yoke member in the horizontal plane and permit rotation of the yoke member on the trunnions 44 and 45 and limited linear horizontal movement of the yoke member.

An attachment point 58 at the rear of adaptor 46 is connected to one lug of a flexure ring link 59. The other lug of the link 59 is attached to a sliding member 60 carried in slots 61, 62 of a double lugged fitting 63 rigidly attached to the roof 13 of the tunnel. The member 60 is adjustably located in the slots 61, 62 by means of a turnbuckle 64 connecting it with a fixed anchoring point 65.

Cemented to all the flexure ring links are electrical strain gauges (not shown), but since these are part of the instrumentation of the tunnel and do not form part of the present invention, they will not be described herein.

The test model is mounted on the arm 47 by any of the approved methods presently in use. The model is hollow and is provided with a scale jet orifice 66 which forms a continuous passage and outlet with the hollow yoke member 28 and the mounting arm 47.

The operation of the structure is as follows: the system must first be calibrated and this is done by swinging the second plates 29, 30 on their screw threaded ducts 15, 16 in order to obtain the minimum workable clearance between the plates of each pair, the clearance being such that the plates are just out of contact. The plates 29, 30 are then locked in place by means of lock nuts 17, 18 and static balance of the yoke member is attained by adjusting the screwed rods 42, 43 carrying the balance weights 40, 41.

Air flow checks are carried out first with the gaps between the plates of each pair sealed off by means of friction tape and then again with the couplings 24, 25 in their normal free state, these checks enabling the operator to calculate the thrust at the jet orifice 66 for given pressures at the supply hoses 21, 22.

The angle of attack of the model 49 is set by adjusting turnbuckle 64. With the tunnel airstream in motion, the desired air pressure from an outside source is applied through hoses 21, 22. There is an immediate loss of air from between the plates of each transfer coupling which increases in velocity as it issues from the ports 37, causing a pressure drop between the plates and a consequent mutual attraction between them. Eventually, flexure of the yoke 28 will allow the units to attain a state of equilibrium wherein the gaps between the plates will be held constant and the air loss becomes uniform, at the same time forming a lubricating film between the plates. The bulk of the air passes up the hollow members 32, 33 and across member 31, where the two streams combine to pass down the arm 47 into the model 49, finally passing out from the orifice 66 to simulate the jet thrust.

It will be seen that the invention provides a structure for supporting a model in a wind tunnel and supplying it with compressed fluid while reducing frictional forces tending to obscure the performance of the model in the tunnel.

Although the invention has been described in its preferred form with some degree of particularity, it is to be understood that the present disclosure of the preferred form has been made only by way of example and that numerous changes in details of construction and in the combination and arrangements of parts may be resorted to without departing from the spirit of the invention and the scope of the appended claims.

What I claim as my invention is:

1. A structure for supporting a model in a wind tunnel and supplying compressed fluid to the model, including a tubular yoke member having two free ends, a tubular arm having one end fast to the yoke member and the other end arranged for the attachment of a model, the bore of the arm being in communication with the bore of the yoke member, support means stationary relatively to the wind tunnel, two fluid transfer couplings, one coupling being interposed between each of the free ends of the yoke member and the support means, each coupling comprising a pair of parallel co-operating plate-like elements, the first element of each pair being mounted on a free end of the yoke member and the second element of each pair being mounted on the support means, at least one plate of each coupling being movable towards and away from the other plate during operation of the coupling; mounting means for the yoke member permitting it at least freedom of translational movement, relative to the wind tunnel, in directions parallel to the plates and freedom of rotational movement, relative to the wind tunnel, about axes normal to the plates, mutually registering ports in the elements of each coupling, an inlet in each of said second elements for the supply of compressed fluid to the port in the element, the ports in said first elements being in communication with the bore of the yoke member and clearances being provided between the elements of each coupling permitting some of the fluid supplied to the coupling to pass between its elements to maintain them spaced apart in a state of equilibrium.

2. A structure for supporting a model in a wind tunnel and supplying compressed fluid to the model, including a tubular yoke member having two free ends, a tubular arm having one end fast to the yoke member and the other end arranged for the attachment of a model, the arm depending between the limbs of the yoke member and the bore of the arm being in communication with the bore of the yoke member, support means stationary relatively to the wind tunnel, two fluid transfer couplings, one coupling being interposed between each free end of the yoke member and the support means, each coupling comprising a pair of parallel plates, the first plate of each pair being mounted on a free end of the yoke member normal to the plane of the member and the second plate of each pair being mounted on the support means, at least one plate of each coupling being movable towards and away from the other plate during operation of the coupling; mounting means for the yoke member permitting it at least freedom of translational movement, relative to the wind tunnel, in directions parallel to the plates and freedom of rotational movement, relative to the wind tunnel, about axes normal to the plates, mutually registering ports in the faces of the plates of each coupling, an inlet on each of the second plates for the supply of compressed fluid to the port in the plate, the ports in the first plates being in communication with the bore of the yoke member and clearances being provided between the plates of each coupling permitting some of the fluid supplied to the coupling to pass between its plates to maintain them spaced apart in a state of equilibrium.

3. A structure for supporting a model in a wind tunnel and supplying compressed fluid to the model, including a tubular yoke member having two free ends, a tubular arm having one end fast to the yoke member and the other end arranged for the attachment of a model, the bore of the arm being in communication with the bore of the yoke member, a mount stationary relatively to the wind tunnel, a link of adjustable length, one end of said link being attached to the mount and the other end of said link being attached to the yoke member, support means stationary relative to the wind tunnel, two fluid transfer couplings, one coupling being interposed between each of the free ends of the yoke member and the support means, each coupling comprising a pair of co-operating parallel plates, the first plate of each pair being mounted on a free end of the yoke member normal to the plane thereof and the second plate of the pair being mounted on the support means, at least one plate of each coupling being movable towards and away from the other plate during operation of the coupling; mounting means for the yoke member permitting it at least freedom of translational movement, relative to the wind tunnel, in directions parallel to the plates and freedom of rotational movement, relative to the wind tunnel, about axes normal to the plates, mutually registering ports in both plates of each coupling, an inlet on each of said second plates for the supply of compressed fluid to the port in the plate, means to adjust said second plates towards and away from said first plates, and balance weights on said first plates, the ports in said first plates being in communication with the bore of the yoke member and clearances being provided between the plates of each coupling permitting some of the fluid supplied to the coupling to pass between its plates to maintain them spaced apart in a state of equilibrium.

4. A structure for supporting a model in a wind tunnel and supplying compressed fluid to the model, including a yoke member, an arm having one end fast to the yoke member and the other end arranged for the attachment of a model, support means stationary relatively to the wind tunnel, a fluid transfer coupling interposed between the yoke member and the support means, the coupling comprising a pair of parallel, co-operating plates, the first plate of the pair being mounted on the yoke member and the second plate of the pair being mounted on the support means, at least one plate of the coupling being movable towards and away from the other plate during operation of the coupling; mounting means for the yoke member permitting it at least freedom of translational movement, relative to the wind tunnel, in directions parallel to the plates and freedom of rotational movement, relative to the wind tunnel, about axes normal to the plates, mutually registering ports in the plates of the coupling, an inlet in the second plate for the supply of compressed fluid to the port in the plate, and duct means leading to the model from the port in the first plate, a clearance being provided between the plates of the coupling permitting some of the fluid supplied to the coupling to pass between its plates to maintain them spaced apart in a state of equilibrium.

5. A structure for supporting a model in a wind tunnel and supplying compressed fluid to the model, including a yoke member having two free ends, an arm having one end fast to the yoke member and the other end arranged for the attachment of a model, support means stationary relatively to the wind tunnel, two fluid transfer couplings, one coupling being interposed between each of the free ends of the yoke member and the support means, each coupling comprising a pair of parallel, co-operating plates, the first plate of each pair being mounted on a free end of the yoke member and the second plate of the pair being mounted on the support means, at least one plate of each coupling being movable towards and away from the other plate during operation of the coupling; mounting means for the yoke member permitting it at least freedom of translational movement, relative to the wind tunnel, in directions parallel to the plates and freedom of rotational movement, relative to the wind tunnel, about axes normal to the plates, mutually registering ports in the plates of each coupling, an inlet in each of said second plates for the supply of compressed fluid to the port in the plate, and duct means leading to the model from the ports in said first plates, clearances being provided between the plates of each coupling permitting some of the fluid supplied to the coupling to pass between its plates to maintain them spaced apart in a state of equilibrium.

References Cited in the file of this patent
UNITED STATES PATENTS

| | | |
|---|---|---|
| 2,484,468 | Schaad | Oct. 11, 1949 |
| 2,732,711 | Darmody | Jan. 31, 1956 |

OTHER REFERENCES

"Life" Magazine, November 27, 1944 (p. 49).